Jan. 14, 1964     G. U. GRAVEN     3,117,615
PIPE CRIMPER AND EXPANDER
Filed Oct. 22, 1962     2 Sheets—Sheet 1
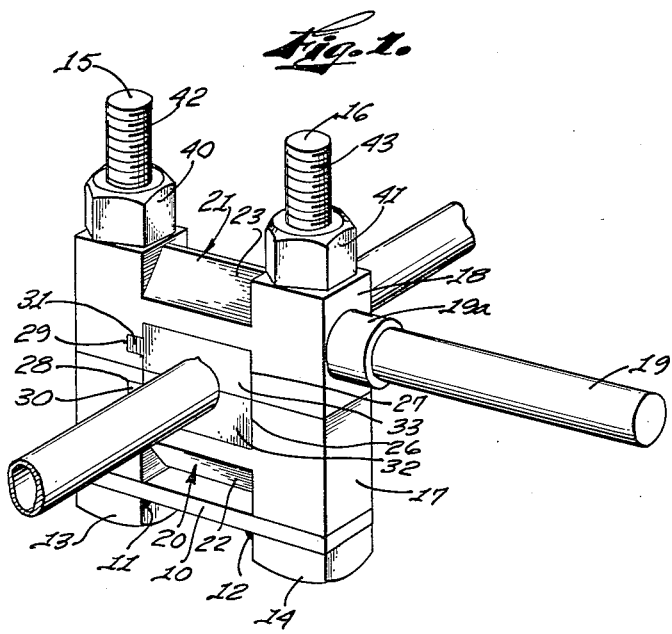
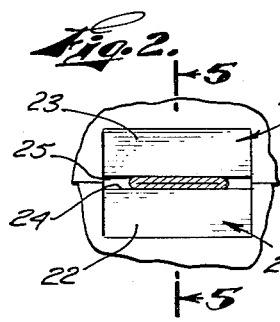 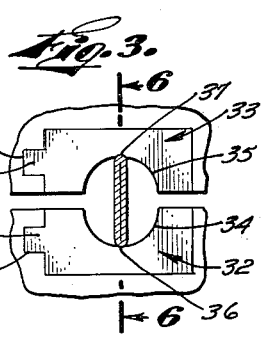 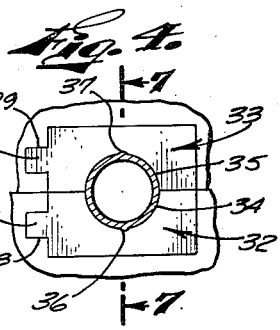
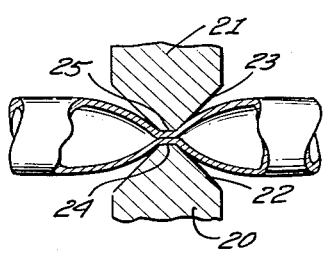 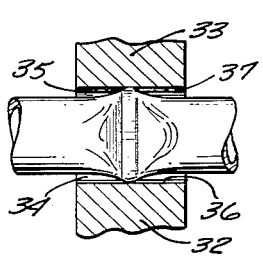 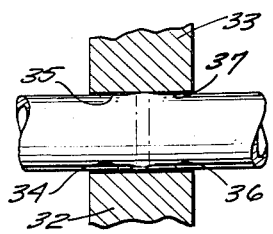
INVENTOR
GENE U. GRAVEN
BY FULWIDER, MATTINGLY & HUNTLEY
ATTORNEYS

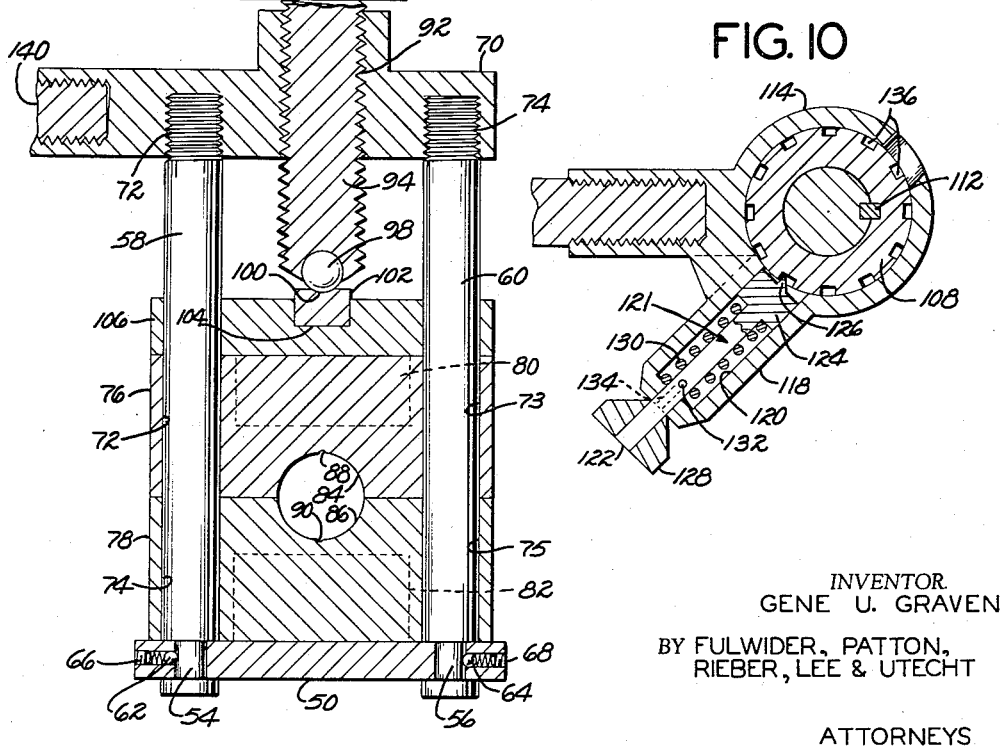

United States Patent Office 3,117,615
Patented Jan. 14, 1964

3,117,615
PIPE CRIMPER AND EXPANDER
Gene U. Graven, Long Beach, Calif., assignor of twenty percent to John J. Erwin, Long Beach, Calif., and forty percent to C. Lee Brossard, Palos Verdes Estates, Calif.
Filed Oct. 22, 1962, Ser. No. 233,183
7 Claims. (Cl. 153—48)

This invention relates generally to metal pipe crimpers and expanders, and particularly to a portable device adapted to be applied to a fluid filled pipe first to collapse a short sectional portion thereof to shut off fluid flow therein to permit downstream repairs to be made and, thereafter, to expand the collapsed sectional portion of the pipe by simple manual reversement of certain of the parts of the device and reapplication thereof to the pipe to return the pipe to substantially original configuration.

This application is a continuation-in-part of copending application Serial No. 819,060, filed June 9, 1959, now abandoned.

Repairs on the downstream side of pipes carrying gas, water, and the like fluids, often present considerable difficulty, because before the repairs can be undertaken, it is usually necessary to shut off an upstream valve that may control the fluid flow to other extensive points of consumption not needing repair and where such interruption of the supply may have serious consequences. Water pipes encountered in excavating, where all water cannot be shut off, and in pipe systems in hospitals, are typical of situations, where the present invention is of great advantage and service. Many other cases could be cited wherein temporary collapse of a pipe and expansion after repair by a portable device would relieve difficult situations with safety.

The present invention provides a portable device having crimping die members that are readily applied to any size or type of malleable or ductile metal pipe to crimp the pipe sufficiently to close the passage therethrough and permit downstream repair. The device is then removed from the pipe, the die members manually reversed, and the device reapplied to the crimped portion of the pipe for the expansion operation with the same parts and without resulting damage to the pipe.

One of the main objects of the invention is to provide a unitary pipe crimper and expander device that is manually portable to any job and can be used on the specific pipe requiring repair without stopping fluid flow in other lines upstream thereof.

Another object of the invention is to provide a device that is readily applied to any size or configuration of pipe quickly to crimp the pipe before repair and, thereafter, expand the crimped portion of the pipe by simple manual reversement and pressure actuation of the die mechanism.

Still another object of the invention is to provide a device of relatively simple mechanical construction that is able, by quick reversement of the portion of the die members, first to crimp a pipe for repair and, thereafter, to expand it to its original configuration.

A still further object of the invention resides in the arrangement and interchangeability of the dies in the die holders, whereby collapse and expansion of any size or type of pipe may be quickly accomplished.

Yet another object of the invention is to provide not only a pipe crimping device, but also an expanding means using the same parts, the expanding means being designed to hold the pipe firmly in proper position for expansion.

With the foregoing objects in view, and such other objects, advantages, and features of novelty as will become apparent hereinafter to those skilled in the art, to which this invention relates, the invention consists essentially in the assembly, arrangement, and construction of parts, all as hereinafter more particularly described, reference being had to the accompanying drawings, in which:

FIGURE 1 is a perspective view of the device showing the die elements thereof in pipe expanding position and showing a length of expanded pipe therein.

FIGURE 2 is a partial front elevational view of the device showing the die elements thereof in pipe crimping position and showing a crimped pipe therein in cross section.

FIGURE 3 is a view similar to FIGURE 2, but showing the die elements of the device in pipe expanding position and showing a crimped pipe section positioned therein ready for the expansion operation.

FIGURE 4 is a view similar to FIGURE 3 showing the pipe expanded therein to original configuration.

FIGURE 5 is a sectional view taken on the line 5—5 of FIGURE 2.

FIGURE 6 is a sectional view taken on the line 6—6 of FIGURE 3.

FIGURE 7 is a sectional view taken on the line 7—7 of FIGURE 4.

FIGURE 8 is a perspective view similar to FIGURE 1, showing a modified form of the device.

FIGURE 9 is a sectional view taken on the line 9—9 of FIGURE 8.

FIGURE 10 is a sectional view taken on the line 10—10 of FIGURE 9.

Referring first primarily to FIGURE 1 of the drawings, a die supporting base plate 10 receives through holes adjacent its opposite ends a pair of bolts 15 and 16, the heads 13 and 14 of which are attached to the base plate by suitable means, such as by welding at 11 and 12. A pair of die holders 17 and 18 are suitably bored adjacent opposite ends for slidable, reversible mounting on the bolts 15 and 16. The die holders 17 and 18 are identical with the exception that the die holder 18 has a tool handle 19 secure in a projecting tubular hub 19a thereon. The die holders 17 and 18 have identical crimping die portions 20 and 21 formed thereon and as an integral part thereof. For pipe crimping operations the die holders are positioned on the bolts 15 and 16 such as to locate the crimping die portions 20 and 21 thereof opposite one another, as shown in FIGURES 2 and 5. The die portions 20 and 21 are formed with similar tapers 22 and 23, respectively, terminating in opposed narrow crimping jaws 24 and 25, respectively. The jaws 24 and 25 are shaped with narrow, relatively flat end surfaces for pipe crimping without danger of severing or cracking the pipe exterior. The die holders 17 and 18 have their opposite sides recessed at 26 and 27, respectively, for detachably receiving expansion dies 32 and 33. Grooves 28 and 29 formed in the side walls of recesses 26 and 27 are adapted to receive interfitting projecting ribs 30 and 31, respectively, formed on expansion dies 32 and 33, respectively. The expansion dies 32 and 33 are identical and are detachably mounted, as above described, in the die holders 17 and 18 in order to permit interchangeability with other expansion dies to fit pipes of varying size and configuration.

The pipe expanding portions of the dies 32 and 33 positioned opposite one another include half cylindrical sections 34 and 35, respectively, the radii of which may be made to accommodate different pipe size. The pipe expanding sections 34 and 35 may, instead of being cylindrical as shown, have other shapes depending upon the cross sectional configuration to which the pipe is to be restored, as the case may be. The half cylindrical sections 34 and 35 have diametrically opposite, longitudinally disposed small grooves or notches 36 and 37, respectively, formed therein, which act as index means to non-rotatably grip and support the crimped edges of the pipe before and during expansion, as shown in FIGURES 3, 4, 6, and 7. A plurality of interchangeable expansion dies are provided to take care of pipes of different sizes and configurations, but the quick detachable mounting on each being identical in size and interfitting relationship.

The means for clamping or releasing the die holders 17 and 18 and attached dies is provided in dog nuts 40 and 41, which are received on the threaded ends 42 and 43 of the projecting bolts 15 and 16, respectively.

The operation of the device of FIGURES 1 to 7 inclusive is as follows. Portability of the tool to any job permits its use, as hereinbefore mentioned, on a single pipe needing repair without shutting off an entire fluid supply system. Once the pipe is located and the point therein at which the shut-off is to be made is determined, the dog nuts 40 and 41 are removed and die holders 17 and 18 removed and replaced on the bolts 15 and 16 in position on the pipe with the crimping die portions 20 and 21 in opposed operative position. The dog nuts 40 and 41 are rethreaded on the bolts 15 and 16 and progressively tightened to force the die holders and crimping die portions 20 and 21 thereon together into clamping postion to crimp the pipe, as shown in FIGURES 2 and 5, to shut off the flow through the pipe at that point. Repairs on the downstream side of the collapsed pipe can then be made without interfering with the fluid flow in other upstream lines. The repair finished, the dog nuts 40 and 41 are removed from the threaded bolts 15 and 16 and the device withdrawn from the pipe by separation of the die holders 17 and 18. The die holders 17 and 18 are then manually reversed in position on the bolts 15 and 16 with the device again placed about the pipe with the semi-cylindrical sections 34 and 35 of the expansion dies 32 and 33 encircling the crimped portion of the pipe, as shown in FIGURES 3 and 6. The dog nuts 40 and 41 are then rethreaded on the bolts 15 and 16. With the edges of the crimped pipe held in the grooves 36 and 37, as shown in FIGURES 3 and 6, the dog nuts 40 and 41 are again gradually tightened to apply force edgewise to the crimped portion of the pipe sufficient to cause the crimped portion to open, followed by expansion thereof to the original configuration of the pipe, as shown in FIGURES 4 and 7. The portable tool is then withdrawn from the pipe by removal of the dog nuts and the upper expansion die and die holder.

Referring next primarily to FIGURES 8, 9, and 10 of the drawings, a die supporting base plate is provided at 50. Laterally extending dead-ended connector slots 51 and 52 are provided in the base plate 50 adjacent opposite ends thereof for detachable connection with the lower headed ends 54 and 56 of a parallel pair of guide rods 58 and 60. A pair of spring pressed ball detents 62 and 64 are contained in cylindrical recesses, which extend through opposite end portions of the base plate 50 into the slots 51 and 52, as shown at 66 and 68, which detents serve to engage the aforesaid lower headed end portions 54 and 56 of the columns 58 and 60 detachably to retain them in engagement within the connector slots 51 and 52. The upper ends of the guide columns 58 and 60 are threadedly attached to a yoke member 70.

A pair of die members 76 and 78 are provided, each formed with guide bores adjacent opposite ends thereof, as shown at 72, 73, 74, and 75, for slidable mounting on the guide columns 58 and 60. The die members 76 and 78 are preferably identical having identical crimping die portions 80 and 82, respectively, integrally formed on one side of each die and having identical expansion die portions 84 and 86 on the opposite sides of each die. The crimping die portions 80 and 82 are convex or wedge shaped, preferably with tapered sides terminating in narrow, relatively flat end surfaces to form crimping jaws similar to that shown at 24 and 25 in FIGURES 1 and 5 for forceful application to a relatively short sectional portion of a pipe for crimping such pipe without severing or cracking the pipe exterior.

The expansion die portions 84 and 86 of the dies 76 and 78, respectively, are identical, as hereinbefore mentioned, each being formed integrally to include a concave or half cylindrical section, the size or radius of which may be made to accommodate the size of the particular pipe to which it is to be applied. A plurality of interchangeable dies, similar to those shown at 76 and 78, may thus be provided having different sized cavities or cylindrical sections in the expansion die portions thereof to take care of pipes of different sizes and configurations. Each of the half cylindrical sections of the expansion die portions 84 and 86 of the dies is formed with an internal, longitudinally disposed groove or notch, as shown at 88 and 90, similar to the grooves 36 and 37 shown in FIGURES 3 and 4, which grooves act as index means non-rotationally to grip and support the crimped edges of a pipe preparatory to and during expansion of the crimp as and in a manner similar to that shown in FIGURES 3, 4, 6, and 7.

Instead of making the crimping die portions 80 and 82 and the expansion die portions 84 and 86 integral with the die members 76 and 78, respectively, as shown in FIGURES 8 and 9, they may, if desired, be constructed such that the expansion die portions and also the crimping die portions are detachably carried in the die members or holders, as shown and hereinbefore described in connection with FIGURES 1 to 4 inclusive.

The yoke 70 is provided with a threaded bore 92 centrally located between the guide columns 58 and 60 and which receives a threaded jack screw 94. Contained within a spherical recess formed in the lower end of the jack screw 94 is a ball bearing 98. The ball bearing 98 makes pivotal bearing contact in a shallow spherical recess 100 formed in the upper surface of a bearing block 102, which bearing block, in turn, is contained within a rectangular recess 104 in the upper midsection of a die pressure plate or block 106. The die pressure block 106, like the dies 76 and 78 is bored adjacent its opposite ends for slidable support and movement along the guide columns 58 and 60.

The upper end of the jack screw 94 extends through an annular ratchet hub member 108 and terminates at its upper end in a hand wheel, as shown at 110. The jack screw 94 is normally fixed, non-rotatable with respect to the ratchet hub 108 by means of an inner connecting key 112. Surrounding the periphery of the ratchet hub 108 is a generally annular ratchet housing 114 from which extends laterally an integrally formed, internally threaded handle connector 116 and an integrally formed, tubular shaped ratchet pawl housing 118. The ratchet pawl housing 118 is formed with an inner coaxial bore 120, which opens at its inner end to the interior of the annular housing 114 and contains coaxially slidable therein a ratchet pawl assembly 121. The ratchet pawl assembly 121 includes a rod 122 having formed at its inner end a ratchet pawl head 124 carrying on the innermost end surface thereof a buttress shaped ratchet tooth 126 and threadedly connected to the opposite outer end thereof a knurled adjusting head 128. The ratchet assembly is spring pressed inwardly, as shown in FIGURE 10, by a helical spring 130, which acts under compression between the inside of the outer end of the ratchet housing 118 and the outer end of the ratchet head 124. The ratchet rod 122 is provided with a lock pin 132 extending crosswise therethrough, the outer projecting ends of which make slidable engagement with a pair of diametrically opposite slots entering the outer end of the ratchet housing 118, as shown at 134.

The ratchet hub 108 is provided with a plurality of circumferentially spaced apart, longitudinally extending ratchet grooves, as shown at 136, with which the ratchet tooth 126 is adapted to make ratcheting engagement, the tooth 126 being formed with one axially extending face and an opposite angularly sloping face. When the ratchet head 124 carrying the ratchet tooth 126 is in the position shown in FIGURE 10, it is adapted to make one way locking engagement with each of the ratchet grooves 136 when the ratchet housing 114 is urged rotationally in a clockwise direction relative to the ratchet hub 108, but is adapted to permit relative rotation between the ratchet housing 114 and the ratchet hub 108 when the ratchet housing 114 is urged to rotate in a counterclockwise direction relative to the ratchet hub 108.

Upon applying an outward pull to the ratchet knob 128 in opposition to the force of spring 130 sufficiently to withdraw the cross pin 132 from the slots 134, the ratchet assembly may be rotated about its axis to a position in which the ratchet tooth 126 faces in a direction opposite to that shown in FIGURE 10 and the cross pin 132 then permitted to re-engage the slots 134 in that position. This latter adjustment of the ratchet assembly will thus reverse the action of the ratchet permitting relative rotation between the ratchet housing 114 and the ratchet hub 108 in a clockwise direction, but locking it against relative rotation in the opposite direction. Thus, by adjustment of the ratchet assembly, the action of the ratcheting device may be adjustably reversed.

The ratchet handle connection 116 is provided with a radially extending lever 138 by means of which torque may be applied to the ratchet housing 114 to rotate the ratchet hub 106 and the jack screw 94 relative to the yoke 70. The yoke 70 is similarly provided with a radially extending lever 140 through which may conveniently be applied to the device a balancing torque, which is equal and opposite to that applied to the before mentioned lever 138.

The operation of the modified form of the device hereinbefore described in connection with FIGURES 8, 9, and 10 is as follows.

When the pipe is located and the point thereon at which the shut-off is to be made is determined, and assuming the device to be in its asembled condition shown in FIGURES 8 and 9, the base plate 50 is first detached from the lower headed ends 54 and 56 of the guide columns 58 and 60, and the die members 76 and 78 may then be withdrawn from the guide columns 58 and 60 and the upper die member 76 relocated on the guide columns 58 and 60 with the crimping die portion 80 thereof directed downwardly. Following this, the lower end of the device with the lower die member 78 and the base plate 50 removed, is placed over and around the pipe and then the lower die member 78 replaced on the guide columns 58 and 60 with the crimping die portion 82 thereof facing upwardly. The crimping die portions 80 and 82 of the die members 76 and 78, respectively, are thus placed in opposition to or confronting one another on opposite sides of the pipe in readiness for the crimping operation. Next, the base plate 50 is re-attached to the lower headed ends 54 and 56 of the guide columns 58 and 60, respectively. The ratchet assembly 121 is then adjusted to the position shown in FIGURE 10, and clockwise rotation imparted to the jack screw 94 relative to the yoke member 70 by suitable movement of the lever 138, either rotationally or back and forth through a convenient rotational angle. The jack screw 94 is thus screwed downwardly through the threaded bore 92 in the yoke 70, and thereby applying sufficient force from the jack screw through the ball bearing 98, bearing block 102 and die pressure plate 106 to the upper die member 76 and also equal and opposite force through the guide columns 58 to the base plate 50 and thence to the lower die member 78, to bring the crimping die portions 80 and 82 of the dies together and cause the pipe to be deformed or crimped therebetween in a manner similar to that illustrated in and described in connection with FIGURES 2 and 5.

When the repairs on the downstream side of the thus crimped pipe has been completed, the ratchet, assembly 121 is rotated to a position opposite to that shown in FIGURE 10 and the jack screw rotated by the action of lever 138 in a counterclockwise direction relative to the yoke member 70, as viewed in FIGURE 10, sufficiently to remove the crimping force previously applied to the die members 76 and 78 and permit them to be opened. Following this, the base plate is disconnected from the lower ends of the guide columns 58 and 60 and the die members 76 and 78 reversed in their positions thereon such that the semi-cylindrical expanding die portions 84 and 86 are positioned confrontingly opposite one another about the pipe in the positions shown in FIGURES 3, 6, 8, and 9 with the edges of the crimped portion of the pipe in engagement with the grooves 88 and 90. The jack screw is then again operated in the manner hereinbefore described to apply force edgewise to the crimped portion of the pipe sufficient to cause the crimp portion to open within the die portions, followed by expansion thereof substantially to the original configuration of the pipe in a manner similar to that shown in and described in connection with FIGURES 4 and 7. The tool is then removed from the pipe by removal of the force applied through the jack screw 94 and by removal of the base plate 50 and the lower die member 78.

Since various modifications can be made in the hereinbefore described invention, it is to be understood that the foregoing is illustrative only and that the invention is not limited thereby, but may include various modifications and changes made by those skilled in the art without distinguishing from the scope of the invention, as defined in the appended claims.

What is claimed is:

1. A portable tool applicable around a metal pipe for deforming a sectional portion thereof to control fluid flow therein, comprising:
   a base plate having parallel die supporting guides projecting therefrom;
   a pair of separate die members the opposite ends of each being slidably mounted on said guides, said pair of die members being thereby slidably supported in parallel, side by side relationship, said pair of die members being formed with confronting, parallel, concave die faces, each of said die faces having centrally located and extending axially of a corresponding one of said concave die faces, said grooves serving to seat diametrically opposite edges of a deformed sectional portion of pipe;
   and means connected to said guides for moving said die members slidably toward one another against said base plate to apply sufficient force to opposite ends of such crimped portion of pipe so positioned in said grooves to effect reforming of at least a portion thereof into substantially tubular configuration.

2. A portable tool applicable around a metal pipe for deforming a sectional portion thereof to control fluid flow therein, comprising:
   a pair of parallel, spaced apart guides;
   a pair of separate die members each having opposite end portions slidably mounted on said guides, said die members being thereby slidably supported for movement along said guides toward and away from one another in parallel, side by side relationship,
   each of said die members including a recessed die face, said die members being oriented to locate such die faces in confronting relationship to one another, each of said die faces including a groove positioned centrally and extending axially thereof whereby said grooves are located diametrically opposite one another for seating diametrically opposite edges of a deformed sectional portion of pipe;
   and means releasably mounted on said guides for retaining said die members thereon and for moving said die members toward one another to apply sufficient force upon said deformed sectional portion of pipe seated in said grooves to effect reforming thereof into substantially tubular configuration, said grooves serving to hold said pipe against angular displacement during such reforming.

3. A portable tool applicable around a metal pipe to deform a cross sectional portion thereof to control fluid flow therein, comprising:

a base plate;

parallel guides attached to and projecting from said base plate;

upper and lower die members each having opposite end portions slidably mounted on said guides, said die members thereby being slidably mounted for movement along said guides in parallel, side by side relationship, the lower portion of said lower die member normally engaging the upper portion of said base plate;

a concave die face in one side of each of said die members, such die faces being positioned in said die member and said die members being positioned on said guides such that said die faces are confrontingly positioned relative to one another, each of said die faces including a groove positioned centrally and extending axially thereof whereby said grooves are located diametrically opposite one another for seating diametrically opposite edges of a deformed sectional portion of pipes;

a pressure plate having opposite end portions slidably mounted on said guides, the lower portion of said pressure plate normally engaging the upper portion of said upper die member;

a yoke member attached to the upper ends of said guides, said yoke member being formed with a centrally located, threaded bore intermediate and extending parallel to said guides;

a threaded screw received in said threaded bore, the lower end of said screw being positioned to engage the upper, central portion of said pressure plate;

a ratchet wheel fixed to the upper portion of said screw;

a housing rotatably supported about said ratchet wheel;

a ratchet member carried by said housing and adapted to make one way rotational ratcheting engagement with said ratchet wheel;

and lever means extending laterally from said housing for application of rotational torque to said housing and thence through said ratchet member and ratchet wheel to said screw whereby said pressure plate and said base plate may be forcefully moved toward one another whereby said die members in engagement therewith may be forced together relative to one another with sufficient force to effect the aforesaid deformation of the cross sectional portion of a pipe extending therethrough and the confronting die forces thereon.

4. Apparatus in accordance with claim 3 in which quick detachment means is included for detachably attaching said guides to said base plate, whereby said base plate and said die members may be removed from said guides.

5. A portable tool applicable around a metal pipe to deform a cross sectional portion thereof to control fluid flow therein, comprising:

a pair of horizontal upper and lower die members each being formed with a horizontally extending pipe deforming portion and with a second horizontally extending portion including a recess having a groove therein;

support means supporting said die members with said deforming portions in confronting relationship to deform a pipe, said means being adapted to permit movement of said die members to locate said second portions in confronting relationship with said recesses in aligned relationship to receive said deformed pipe and enable placement of the opposite edges of said deformed pipe in said grooves;

and means operative upon said die members for effective relative movement of said die members toward and away from each other.

6. A tool as set forth in claim 5 where said last-mentioned means includes a vertically extending threaded screw received in a threaded bore in said support means.

7. A tool as set forth in claim 6 which includes force-applying ratchet means engaged with said threaded screw.

References Cited in the file of this patent

UNITED STATES PATENTS

| 722,398 | Bock | Mar. 10, 1903 |
|---|---|---|
| 2,212,090 | Walraven | Aug. 20, 1940 |
| 2,433,546 | Cornelius | Dec. 30, 1947 |
| 2,599,958 | Wallis | June 10, 1952 |
| 2,865,591 | Holinshead | Dec. 23, 1958 |
| 2,910,270 | Schultz | Oct. 27, 1959 |

FOREIGN PATENTS

| 4,483 | Great Britain | Mar. 6, 1884 |
|---|---|---|
| 873,587 | Italy | Mar. 30, 1942 |
| 639,646 | Great Britain | July 5, 1950 |

UNITED STATES PATENT OFFICE
CERTIFICATE OF CORRECTION

Patent No. 3,117,615                        January 14 1964

Gene U. Graven

It is hereby certified that error appears in the above numbered patent requiring correction and that the said Letters Patent should read as corrected below.

Column 6, line 44, after "having" insert -- formed therein a groove, each of said grooves being --.

Signed and sealed this 23rd day of June 1964.

(SEAL)
Attest:

ERNEST W. SWIDER
Attesting Officer

EDWARD J. BRENNER
Commissioner of Patents